US007793673B2

(12) United States Patent
Anello

(10) Patent No.: US 7,793,673 B2
(45) Date of Patent: Sep. 14, 2010

(54) STAR, CONSTELLATION, AND PLANET FINDER

(76) Inventor: Salvatore Anello, 5 Hopper Ave., Pompton Plains, NJ (US) 07444

( * ) Notice: Subject to any disclaimer, the term of this patent is extended or adjusted under 35 U.S.C. 154(b) by 697 days.

(21) Appl. No.: 11/602,709

(22) Filed: Nov. 21, 2006

(65) Prior Publication Data

US 2007/0113877 A1    May 24, 2007

Related U.S. Application Data

(60) Provisional application No. 60/738,535, filed on Nov. 22, 2005.

(51) Int. Cl.
*A45B 25/18* (2006.01)
*A45B 15/00* (2006.01)
(52) U.S. Cl. .................. 135/33.2; 135/33.71; 135/33.41
(58) Field of Classification Search ................. 135/33.2, 135/33.4, 33.41, 33.7, 33.71; 434/285, 287, 434/289
See application file for complete search history.

(56) References Cited

U.S. PATENT DOCUMENTS

| 1,150,731 | A | 8/1915 | Barcus |
| 4,271,604 | A | 6/1981 | Rowsey, Jr. |
| 7,493,908 | B2 * | 2/2009 | Carter et al. .................. 135/16 |
| 2004/0222678 | A1 * | 11/2004 | Hansen ..................... 297/184.1 |
| 2005/0005958 | A1 * | 1/2005 | Connelly .................. 135/33.41 |

* cited by examiner

*Primary Examiner*—David Dunn
*Assistant Examiner*—Danielle Jackson
(74) *Attorney, Agent, or Firm*—Hoffmann & Baron, LLP

(57) ABSTRACT

This invention relates to a device for accurate view of the entire sky from the horizon regardless of the location on earth of the user. The device is an umbrella type design that a person stands underneath and views the night sky through the device. The device includes an umbrella portion and a removably attachable drape portion. The umbrella portion provides the structure of the device and the drape provides the mapped out night sky thereon which may be removably detachable and adjustable for an accurate depiction of the sky.

15 Claims, 3 Drawing Sheets

STAR, CONSTELLATION, AND PLANET FINDER

CROSS-REFERENCE TO RELATED APPLICATIONS

This application claims priority to U.S. Provisional Application No. 60/738,535, filed on Nov. 22, 2005, entitled "Star, Constellation and Planet Finder", all of which is incorporated herein by reference.

FIELD OF THE INVENTION

The present invention relates generally an umbrella type device which maps out the night sky and enables a user to learn and find various objects in the night sky.

BACKGROUND OF RELATED TECHNOLOGY

Umbrellas have been known and used for many years. Functionally, umbrellas most often are used to provide protection from precipitation, particularly rain. Umbrellas may also be used for protection from direct sunlight as in, for example, a parasol.

In addition to purely utilitarian functions, umbrellas have been designed for other uses. For example, U.S. Pat. No. 1,150,731 to Barcus describes a parasol on which fixed stars and constellations are marked as a guide to finding their location in the sky. However, Barcus's invention is fixed on a parasol such that the user views the markings on the outside of the parasol and compares it to the sky. There is not a simple way to incorporate the parasol into the night sky at the time of use. Thus Barcus' parasol is similar to a flat star map.

It is desirable to provide a star map which is easily and accurately lined up with the current night sky. It is also desirable to have a map which accurately depicts the full night sky without distortions or being only partially shown. Further, it is desirable to provide a star map which is portable and adjusts with the change in location while providing the same accuracy.

SUMMARY OF THE INVENTION

The present invention provides a portable device which enables the user to learn the night sky in minutes regardless of their location on Earth.

The present invention is a device which is a portable planetarium for viewing the night sky by mapping the sky, which includes a transparent umbrella including a frame and transparent covering thereover; and a transparent drape having stars mapped out thereon. The drape removably attaches to the covering.

Another embodiment of the present invention includes a portable planetarium for viewing the night sky by mapping the sky, including a frame shaped in a half-sphere, an elongated rod extending from said frame, a transparent cover attached to the frame. The cover has a half-sphere shape to cover the frame. The cover includes at least one connector piece thereon. The drape has a corresponding connector piece for removably attaching to the at least one connector piece. The drape is transparent with markings printed thereon.

A further embodiment includes a portable planetarium for viewing the night sky by mapping the sky, including a half-sphere shaped umbrella including a frame, a handle and transparent cover. The frame has an interior surface and an exterior surface. The handle is attached to the interior surface of the frame. The cover is attached to the exterior surface of the frame. The cover has a top and a rim. The cover includes a series of individual connectors equally spaced in a line from the top to the rim. Further including a transparent drape which includes a corresponding connector piece and markings printed thereon. The corresponding connector piece is located in the center of the drape to identify Polaris. The corresponding connector piece is removably attachable to any of the individual connectors of the cover. The markings map out the stars in the sky.

Another embodiment includes a method of making a portable planetarium, including the steps of constructing a frame which is half-spherical; attaching a transparent cover to said frame and covering the frame, the cover including a top center and peripheral edge. Marking said transparent cover from 90° at the top center of the cover to 0° at the peripheral edge. Providing connectors at each marking. Marking a center of a transparent drape with a corresponding connector to identify Polaris. Mapping out the stars' location on the drape. Attaching the corresponding connector to one of the connectors associated with a users latitude coordinate. Spinning the drape until the stars in the sky align with the stars on the drape.

Another aspect of this invention was to provide a device which allows the viewer to look through and incorporate the night sky into the map.

One advantage is the star map includes glow-in-the-dark star to provide an easier identification and alignment in the night sky.

DETAILED DESCRIPTION OF THE PREFERRED EMBODIMENT

Figure 1:
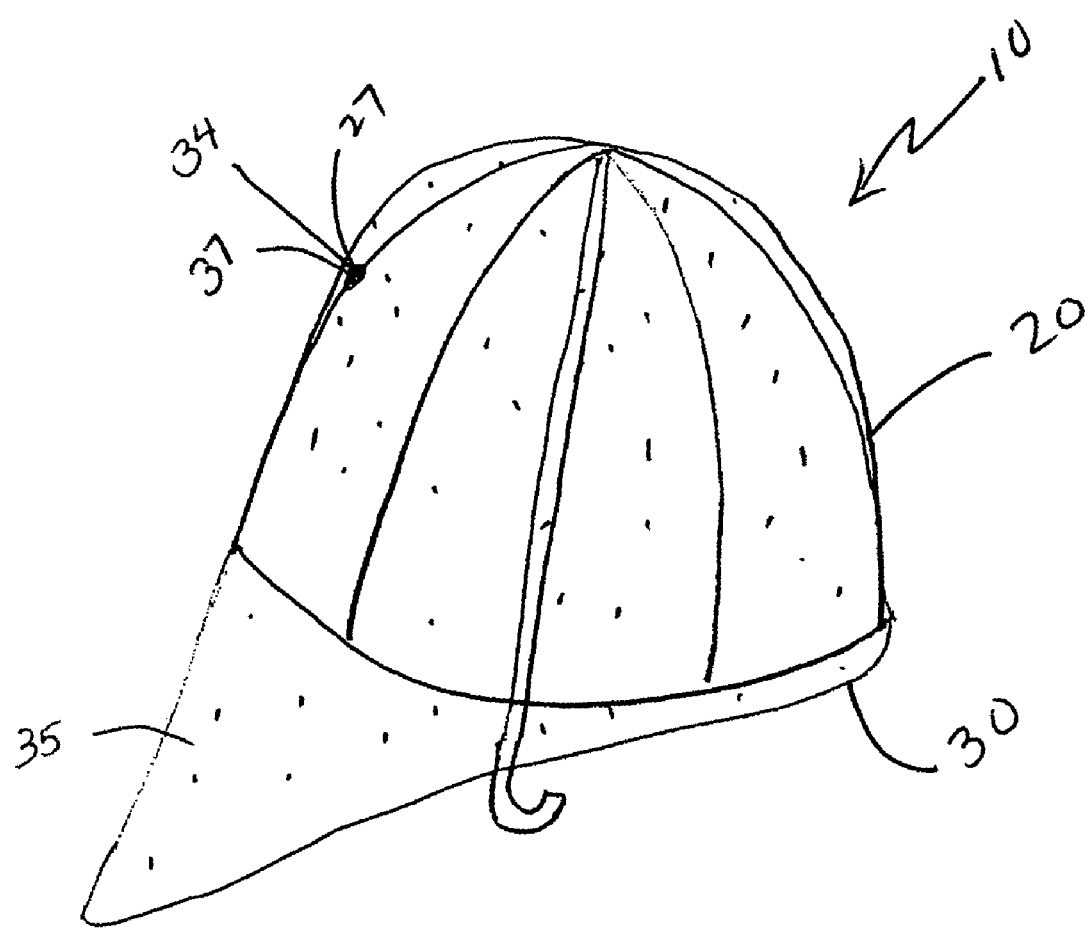
FIG. 1 is a perspective view of the present invention.

The invention described herein provides an accurate view of the entire sky from the horizon regardless of the location on earth of the user. The device 10 is an umbrella type design that a person stands underneath and views the night sky through the device 10. FIG. 1 shows the device 10 including an umbrella portion 20 and a drape portion 30. The umbrella portion 20 provides the structure of the device and the drape 30 provides the mapped out night sky thereon which may be removably detachable and adjustable for an accurate depiction of the sky.

Figure 2:
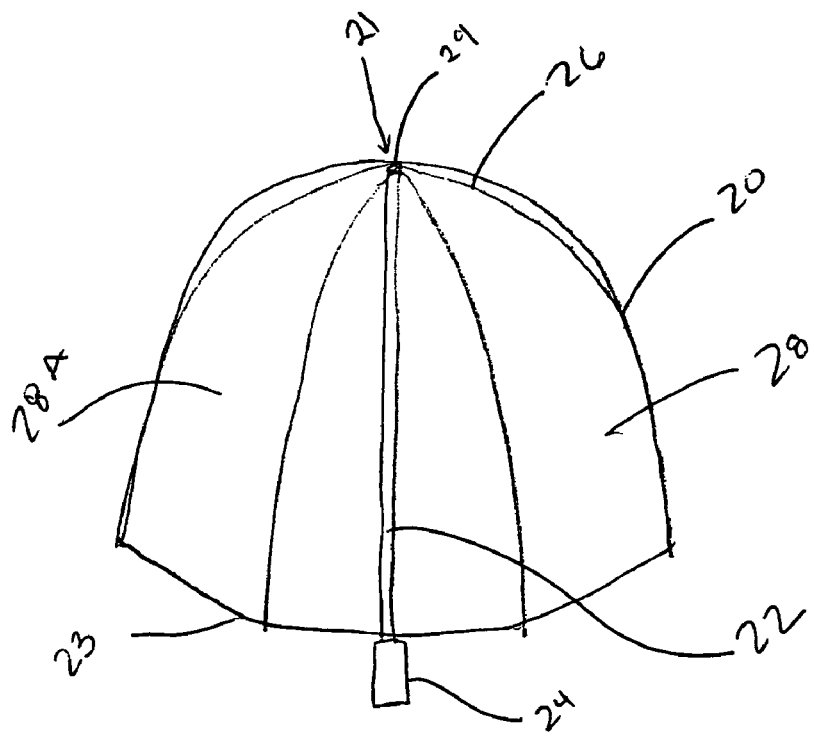
FIG. 2 is a side view of the umbrella portion of FIG. 1.

Referring now to FIG. 2, there is shown the components of a typical umbrella which may be used for construction of the present invention. An elongated rod 22 provides support for a handle 24 or gripping strip for holding the umbrella 20, and further provides support for the frame or radial ribs 26. The radial ribs 26 in turn support a canopy 28, which is composed of a series of panels 28A, where each panel is situated between pairs of adjacent ribs. The panels 28A extend from the tip of the elongated rod 22 to the tips of the radial ribs. The elongated rod 22 does not extend include a point which extends through the top of the canopy. The length of the elongated rod 22 is not critical so long as it is of sufficient length to facilitate handling of the present invention. In fact, since the person using the invention will place his head well within the planetarium, a very short elongated rod 22 and handle 24 may be utilized to avoid excess material obstruction the positioning of the present invention. The method for constructing such a typical umbrella is well known in the prior art.

The top of the umbrella, where the canopy meets the handle, may include a button, flat cap or end cap 29. The end cap 29 substantially flat, it does not protrude above the canopy 28 because this would interfere and possibly tear the drape 30 which overlies the umbrella 20.

The umbrella 20 may be constructed from a variety of materials, such as a polymeric material, which are transparent, and preferably elastic and flexible. The elasticity allows the umbrella to be expanded across the frame 26 of the umbrella 20 in the open position, and compact when the umbrella portion 20 is closed and not in use.

The canopy 28 of the umbrella 20 has a half-dome shape, such that when the user is under the dome shaped canopy 28 the rim 23 of the canopy 28 extends in alignment with the celestial horizon. The shape of the canopy 28 mimics the entire night sky and thus must expand the distance from horizon to horizon. The shape of the canopy 28 is similar to a beach ball cut in half.

Figure 3:
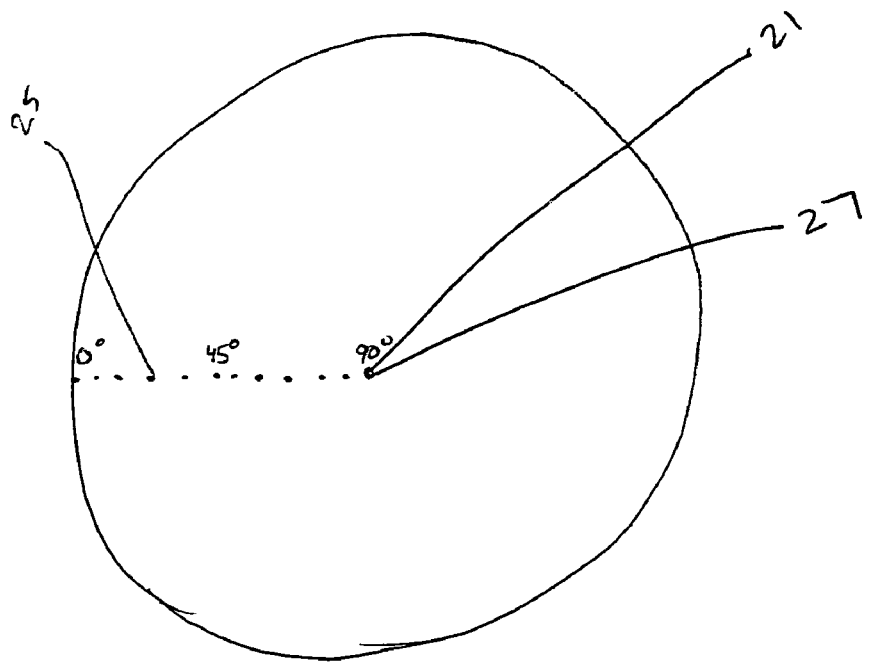
FIG. 3 is a top view of the umbrella portion of FIG. 2.

FIG. 3 shows the top of the view canopy 20 which includes degree markings 25 which represent the latitude. The degree markings 25 range from 90° to 0° for northern hemisphere or −90° to 0° for the southern hemisphere. However, the universal marking 25 from 90° to 0° can be used for both hemispheres. The top center 21 of the umbrella 20 is marked 90° and various markings are labeled down to the 0° marking at the edge of the umbrella. The latitude markings 25 may be arranged in a straight line or any variation as long as it is accurately spaced. FIG. 2 shows the latitude markings 25 arranged in a single line form the top center 21 of the canopy 28 to one edge. The latitude markings 25 may be spaced at various increments, i.e. 1 degree increments, 2 degree increments, 3 degree increments, 5 degree increments, 10 degree increments. The smaller the incremental spacing the more accurate the device 10. The latitude markings 25 include a connector 27 which will correspond to a connector 37 on the drape portion 30 of the device 10. The connector mechanisms 27, 37 are the means for attaching the drape 30 to the umbrella portion 20.

Figure 4:
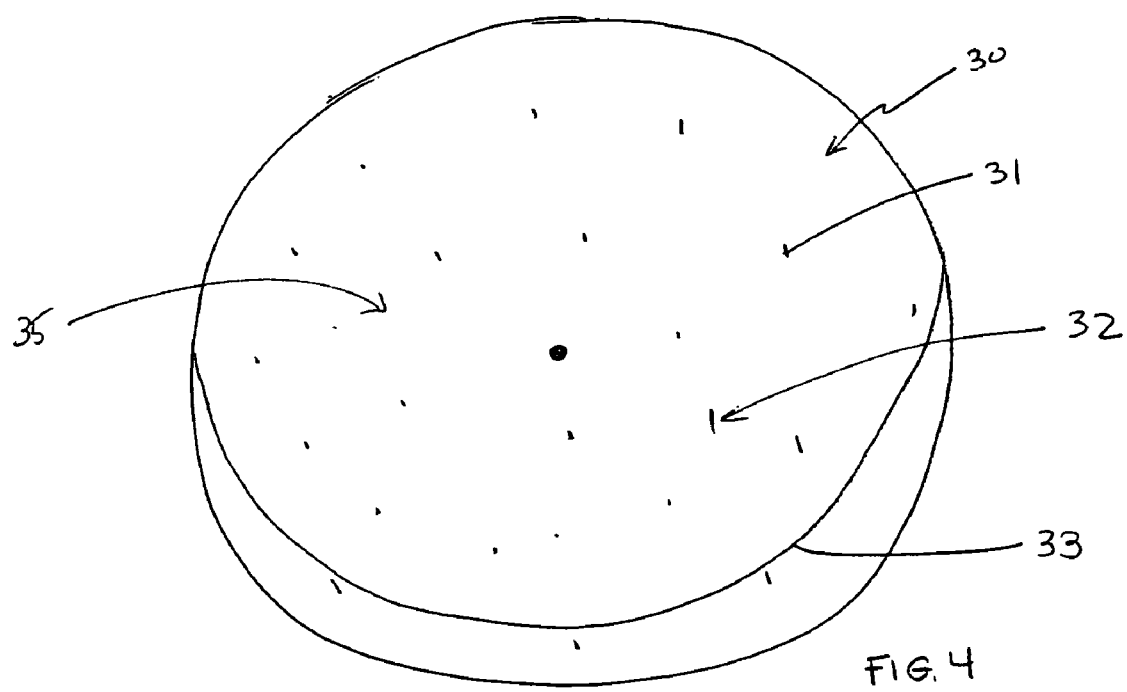
FIG. 4 is a top view of the drape portion of the present invention.

FIG. 4 shows the drape portion 30 which will attach to the umbrella portion 20 and lay over the umbrella portion 20. The drape 30 is much larger then the umbrella 20 to allow for overhang and adjustment of the drape 30 at various latitude degrees 25 on the umbrella 20 and still provide for a full night sky view from the horizon. The drape 30 is made from a transparent or clear polymeric material, i.e. plastic. The drape 30 includes a complete map or planisphere 35 of either the northern or southern hemisphere of the sky, depending on the location of the user. Thus, people purchasing this product for the Northern Hemisphere must purchase the Northern Hemisphere drape. People purchasing this product for the Southern Hemisphere must purchase the Southern Hemisphere drape because different stars are viewable in the different hemispheres.

The stars for the selected hemisphere are printed on the drape 30. The stars and other markings are preferably printed on the drape 30 using a glow-in-the-dark material to provide visibility of the printed map 31 during night use. The drape markings 32 may be as simple or complicated as one prefers for their intended use. The drape 30 may include a combination of star, constellation, galaxy, nebula names, ecliptic line 33, and/or Milky Way Galaxy thereon. This allows for the entire night sky to be learned. The drape 30 also contains the line 33 called the ecliptic. The ecliptic 33 is the line where the planets will appear. Planets can not be mapped out since they are in constant motion. However, the planets follow the ecliptic line 33. Thus, stars which are not identified on the drape 30 but are found on the ecliptic line 33 are actually planets.

Figure 5:
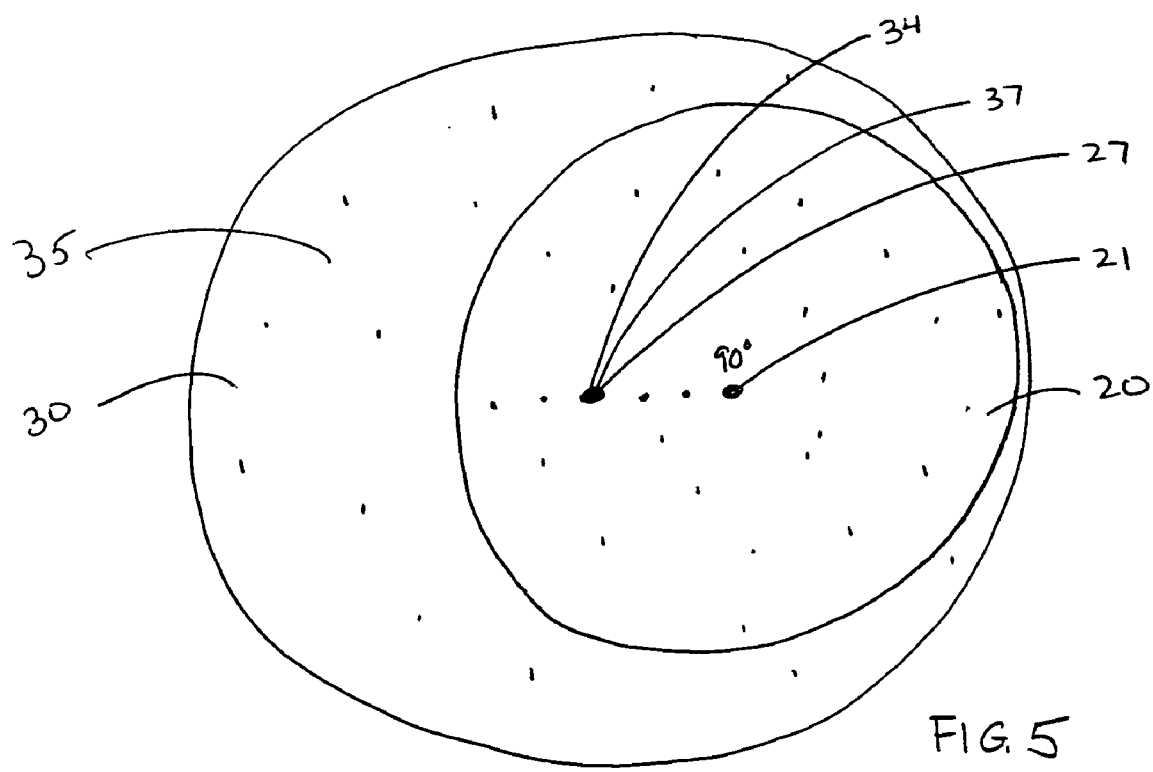
FIG. 5 is a top view of FIG. 1.

FIG. 5 shows the combination of the drape portion 30 and the umbrella portion 20. FIG. 5 shows the Northern Hemisphere drape. Polaris is considered the North Star and is identified on the drape at the center of the drape 30. The drape 30 includes a connector 37 at the Polaris position 34 which corresponds to various connectors 27 on the umbrella portion 20 at the various latitude markings 25. The connectors 37, 27 allows for attachment of the drape 30 to the umbrella 20, respectively. The connector 37 also allows for the drape 30 to spin freely around the connectors 37, 27.

The center of the drape, i.e. Polaris 34 for Northern Hemisphere, is connected (via connectors 37, 27) to the umbrella portion 20 at the location of the user's latitude as identified on the umbrella portion 20. For example, New Jersey is approximately 37 degrees north. Therefore, if the user is located in New Jersey then they would connect the drape at the 37 degree latitude line or somewhere thereabout depending on the degrees of latitude identified on the umbrella. The drape 30 would overhang the umbrella 20 and completely cover the umbrella 20.

FIGS. 1 and 5 show the drape attached to the umbrella 20. The entire edge 23 of the umbrella 20 is aligned completely around with the celestial horizon. The umbrella 20 is held perpendicular to the ground, not tilted. The user will stand inside or under the drape 30 and umbrella 20 to view the sky through the umbrella 20 and drape 30. The user will twist the handle 24 of the umbrella 20 to spin the umbrella 20 about its axis until the connection point 37 (North Star 34 on the drape 30) lines up with the actual North Star (Polaris) in the night sky. The drape 30 can then be spun around the connection points 27, 37 (i.e. North Star 34) until the entire night sky is properly aligned. The North Star will always remain at the same latitude point as the user's location, however, the alignment changes depending on the date and time. Proper alignment will be determined by the date and time and this could be labeled on the outer edge of the drape. When aligned, the complete night sky is identifiable. The markings 32 on the drape including the stars, constellations, galaxies, nebula names, ecliptic line 33 and the Milky Way Galaxy are visible through the umbrella 20 and attached drape 30 covering. Stars not visible on the drape 30 along the ecliptic line 33 are planets.

The device 10 can come in a variety of sizes from a one person umbrella, or multiple person umbrella to a large umbrella used over a patio table, deck or large observation facility.

Therefore, while there have been described as what are presently believed to be preferred embodiments of the present invention, those skilled in the art will realize that other and further changes and modifications can be made thereto without departing from the scope of the invention, and it is intended to claim all such changes and modifications that fall within the scope of the invention.

What is claimed is:

1. A portable planetarium for viewing the night sky by mapping the sky, comprising:
    a transparent umbrella including a frame and transparent covering thereover; and
    a transparent drape having stars mapped out thereon, said drape removably attached to said covering, wherein the drape substantially overlays the umbrella, and the umbrella includes latitude degree markings with connectors located at the latitude degree markings.

2. The portable planetarium of claim 1, wherein said transparent umbrella further includes a flat cap, said transparent covering is sandwiched between said frame and said flat cap, said flat cap is substantially flat to allow said transparent drape to lay over said flat cap.

3. The portable planetarium of claim 2, said drape includes a drape connector mateable with said connectors on said umbrella.

4. The portable planetarium of claim 3, said transparent drape overhangs said transparent covering.

5. A portable planetarium for viewing the night sky by mapping the sky, comprising:
   a frame shaped in a half-sphere;
   an elongated rod extending from said frame;
   a transparent cover attached to said frame, said cover having a half-sphere shape to cover the frame, said cover including at least one connector piece thereon;
   a drape having a corresponding connector piece for removably attaching to said at least one connector piece, said drape is transparent with markings printed thereon, wherein the drape substantially overlays the cover, and the cover includes latitude degree markings with connectors located at the latitude degree markings.

6. The portable planetarium of claim 5, wherein said markings glow-in-the-dark.

7. The portable planetarium of claim 5, wherein said markings include locations of stars in the northern hemisphere.

8. The portable planetarium of claim 5, wherein said markings include locations of stars in the southern hemisphere.

9. The portable planetarium of claim 5, wherein said markings include stars, constellations, galaxies, nebula names, and combinations thereof.

10. The portable planetarium of claim 5, wherein said markings include an ecliptic line.

11. The portable planetarium of claim 5, wherein said markings include a dot to identify Polaris in a center of the drape.

12. The portable planetarium of claim 11, wherein said drape having a center and said corresponding connector piece is located in the center of said drape to identifying Polaris.

13. The portable planetarium of claim 12, wherein said latitude degree markings are a series of equally spaced dots from a center top location of said cover being identified as 90° to an outer edge of the cover being identified as 0°; each of said latitude degree markings include a cover connector to mate with said corresponding connector piece of said drape to provide attachment of said drape to said cover.

14. The portable planetarium of claim 5, said latitude degree markings are a series of equally spaced dots from a center top location of said cover being identified as 90° an outer edge of the cover being identified as 0°.

15. The portable planetarium of claim 5, wherein said drape is larger then said cover.

* * * * *